(12) United States Patent
Yeo

(10) Patent No.: US 12,269,004 B2
(45) Date of Patent: Apr. 8, 2025

(54) MANUFACTURING FACILITY

(71) Applicant: Jie Xiong Jonathan Yeo, Singapore (SG)

(72) Inventor: Jie Xiong Jonathan Yeo, Singapore (SG)

(*) Notice: Subject to any disclaimer, the term of this patent is extended or adjusted under 35 U.S.C. 154(b) by 788 days.

(21) Appl. No.: 17/420,304

(22) PCT Filed: Jan. 7, 2020

(86) PCT No.: PCT/SG2020/050005
§ 371 (c)(1),
(2) Date: Jul. 1, 2021

(87) PCT Pub. No.: WO2020/145893
PCT Pub. Date: Jul. 16, 2020

(65) Prior Publication Data
US 2022/0088559 A1    Mar. 24, 2022

(30) Foreign Application Priority Data
Jan. 8, 2019  (SG) .......................... 10201900158P

(51) Int. Cl.
*B01J 19/00* (2006.01)
*E04H 1/12* (2006.01)
*E04H 5/02* (2006.01)

(52) U.S. Cl.
CPC ....... *B01J 19/0006* (2013.01); *B01J 19/0066* (2013.01); *E04H 1/1205* (2013.01);
(Continued)

(58) Field of Classification Search
CPC ................ B01J 19/0006; B01J 19/0066; B01J 2219/0002; E04H 5/02; E04H 2001/1283
See application file for complete search history.

(56) References Cited

U.S. PATENT DOCUMENTS 4,201,845 A * 5/1980 Feder .................... C12M 41/14
                                                    435/297.2
4,948,519 A    8/1990 Zeh
(Continued)

FOREIGN PATENT DOCUMENTS

CN    102869620 A    1/2013
CN    107112058 A    8/2017
(Continued)

OTHER PUBLICATIONS

Chinese Office Action dated Jun. 2, 2022 in reference to Chinese Application No. 2020800083629 filed Jan. 7, 2020.
(Continued)

*Primary Examiner* — Lessanework Seifu
(74) *Attorney, Agent, or Firm* — Dinsmore & Shohl LLP

(57) ABSTRACT

A manufacturing facility (12) is provided. The manufacturing facility (12) includes one or more interconnectable modules (10). At least one of the one or more interconnectable modules (10) includes a housing (14) and a reactor (16) in 5 the housing (14). The housing (14) has at least one charging inlet (18) and at least one discharging outlet (20). The reactor (16) has at least one reactor inlet (22) coupled to the at least one charging inlet (18) of the housing (14) and at least one reactor outlet (24) coupled to the at least one discharging outlet (20) of the housing (14).

16 Claims, 8 Drawing Sheets

(52) U.S. Cl.
CPC .......... *E04H 5/02* (2013.01); *B01J 2219/187* (2013.01); *E04H 2001/1283* (2013.01)

(56) References Cited

U.S. PATENT DOCUMENTS

| | | | |
|---|---|---|---|
| 5,785,591 | A | 7/1998 | Payne |
| 6,155,747 | A | 12/2000 | Payne et al. |
| 8,061,752 | B2 | 11/2011 | Ohnstad et al. |
| 9,163,847 | B2 | 10/2015 | Platt et al. |
| 9,212,499 | B1 | 12/2015 | Maurer |
| 9,475,020 | B2 | 10/2016 | Coli et al. |
| 2003/0175182 | A1* | 9/2003 | Teall .................. C10L 1/026 422/224 |
| 2005/0193643 | A1 | 9/2005 | Pettus |
| 2005/0272906 | A1 | 12/2005 | Cavaglia |
| 2007/0132262 | A1 | 6/2007 | Chui Peng Sun et al. |
| 2008/0106137 | A1 | 5/2008 | Paton-Ash et al. |
| 2008/0178537 | A1* | 7/2008 | Spangler .............. B23Q 37/00 52/36.1 |
| 2010/0008830 | A1 | 1/2010 | Guiliano et al. |
| 2010/0025409 | A1 | 2/2010 | Hunter |
| 2011/0209321 | A1 | 9/2011 | Kilibarda et al. |
| 2012/0037622 | A1 | 2/2012 | Cantin et al. |
| 2012/0076607 | A1 | 3/2012 | Crane et al. |
| 2012/0077429 | A1 | 3/2012 | Wernimont et al. |
| 2012/0279963 | A1 | 11/2012 | Platt et al. |
| 2013/0047521 | A1 | 2/2013 | Yoder |
| 2013/0256113 | A1* | 10/2013 | Tumiatti ................ C10B 49/14 422/187 |
| 2013/0269735 | A1* | 10/2013 | Roetzel ................ B08B 3/102 134/40 |
| 2014/0219873 | A1 | 8/2014 | Gueh |
| 2015/0344787 | A1* | 12/2015 | Henson .................. C10G 2/32 518/704 |
| 2015/0354201 | A1 | 12/2015 | Gruetering |
| 2016/0273271 | A1 | 9/2016 | Morrell et al. |
| 2017/0306280 | A1 | 10/2017 | Aglen |
| 2018/0065064 | A1 | 3/2018 | Coulton |

FOREIGN PATENT DOCUMENTS

| | | |
|---|---|---|
| CN | 108778465 A | 11/2018 |
| EP | 3037608 A1 | 6/2016 |
| GB | 2493666 A | 2/2013 |
| GB | 2499603 A | 8/2013 |
| JP | 58193297 | 12/1983 |
| WO | 199418286 A1 | 8/1994 |
| WO | 2010028869 A1 | 3/2010 |
| WO | 2011018082 A2 | 2/2011 |
| WO | 2012085880 A2 | 6/2012 |
| WO | 2013077748 A2 | 5/2013 |
| WO | 2014083346 A1 | 6/2014 |
| WO | 2018153502 A1 | 8/2018 |

OTHER PUBLICATIONS

European Search Report mailed Aug. 5, 2022 in reference to Singapore Application No. 20738501.4 filed Jan. 7, 2020.
Chinese Office Action dated Mar. 1, 2023, in reference to Chinese Application No. 202080083629 filed Jan. 7, 2020.
International Search Report and Written Opinion, dated Mar. 9, 2020, pertaining to International Patent Application No. PCT/SG2020/050005.
Australian Examination Report dated Apr. 13, 2023, in reference to Australian Application No. 2020206092 filed Jan. 7, 2020.
Australian Examination report mailed Nov. 24, 2022 in reference to Australian Application No. 202006092 filed Jan. 7, 2020.

* cited by examiner

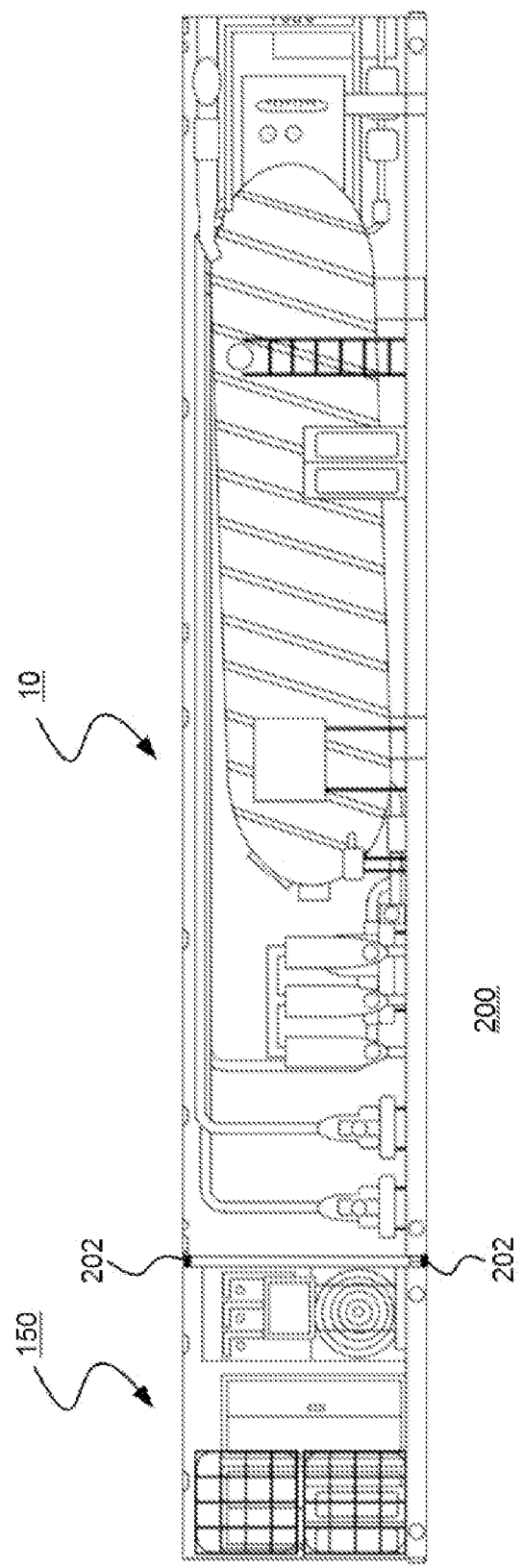

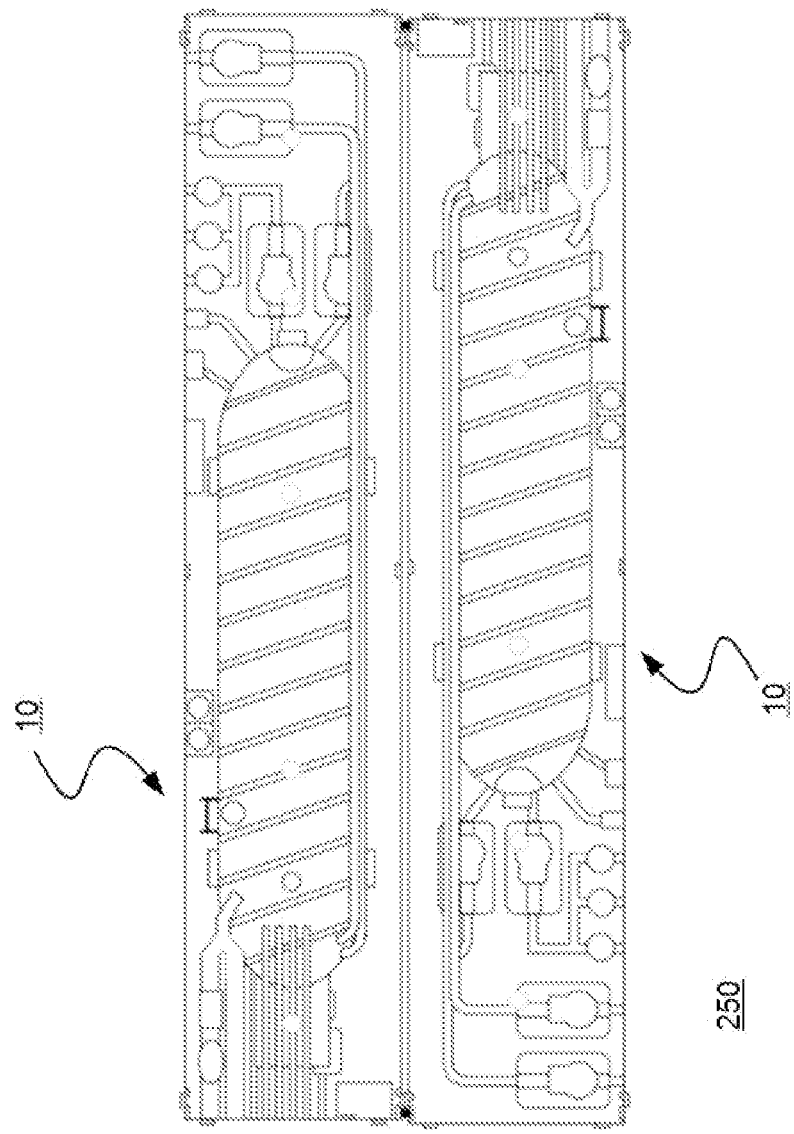
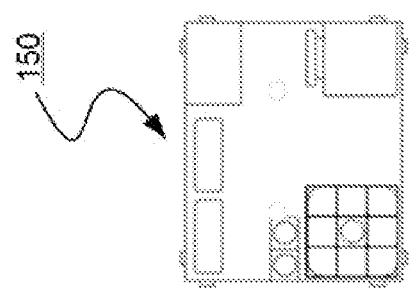
FIG. 4

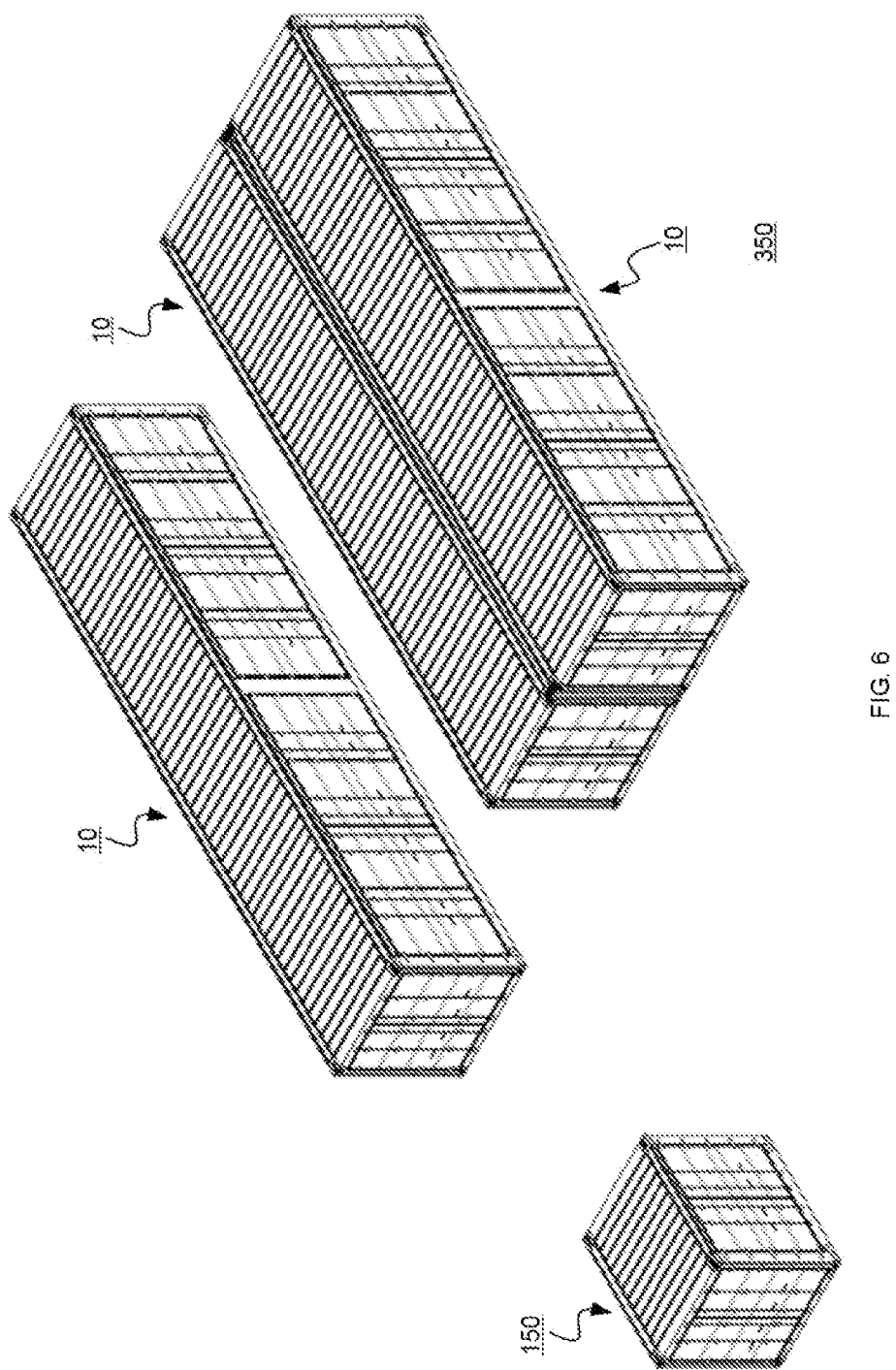

_US 12,269,004 B2_

MANUFACTURING FACILITY

CROSS REFERENCES TO RELATED APPLICATIONS

This application is a national-stage application under 35 U.S.C. § 371 of International Application No. PCT/SG2020/050005, filed Jan. 7, 2020, which International Applications claims benefit of priority to Singapore Application No. 10201900158P, filed Jan. 8, 2019.

FIELD OF THE INVENTION

The present invention relates to the field of industrial manufacturing and more particularly to a manufacturing facility.

BACKGROUND OF THE INVENTION

At present, when an expansion of chemical production capacity is required, this need is often met by construction of new manufacturing facilities or expansion of existing manufacturing facilities. In all cases, planning and implementation typically take up a considerable period of time, large capital investments are required and space constraints have to be dealt with. There is also significant risk involved in such expansionary exercises as in the long lead time between initiation and completion, the business climate may change, making it less or no longer favourable to expand production capacity. However, given the significant outlay already made, it may not be possible or even if possible, may be very costly to cancel an expansion project. It would therefore be desirable to provide a manufacturing facility that can mitigate at least some of these issues.

SUMMARY OF THE INVENTION

Accordingly, in a first aspect, the present invention provides a manufacturing facility including one or more interconnectable modules. At least one of the one or more interconnectable modules includes a housing and a reactor in the housing. The housing has at least one charging inlet and at least one discharging outlet. The reactor has at least one reactor inlet coupled to the at least one charging inlet of the housing and at least one reactor outlet coupled to the at least one discharging outlet of the housing.

Other aspects and advantages of the invention will become apparent from the following detailed description, taken in conjunction with the accompanying drawings, illustrating by way of example the principles of the invention.

BRIEF DESCRIPTION OF THE DRAWINGS

Embodiments of the invention will now be described, by way of example only, with reference to the accompanying drawings, in which:

FIG. 3 is a schematic side view of a manufacturing facility in accordance with an embodiment of the present invention;

FIGS. 4 and 5 are schematic top plan views of manufacturing facilities in accordance with various embodiments of the present invention; and FIG. 6 is a perspective view of a manufacturing facility in accordance with another embodiment of the present invention.

DETAILED DESCRIPTION OF EXEMPLARY EMBODIMENTS

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention.

Figure 1A:
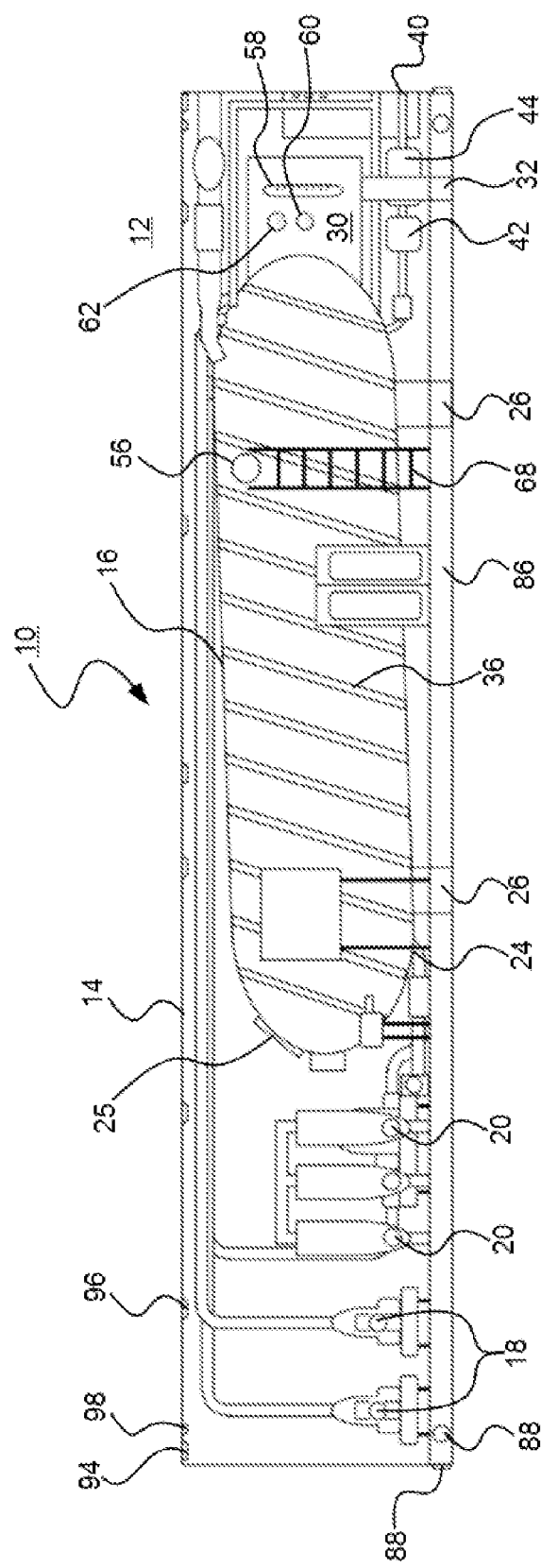
FIG. 1A is a schematic side view of a first interconnectable module of a manufacturing facility in accordance with an embodiment of the present invention.
Figure 1B:
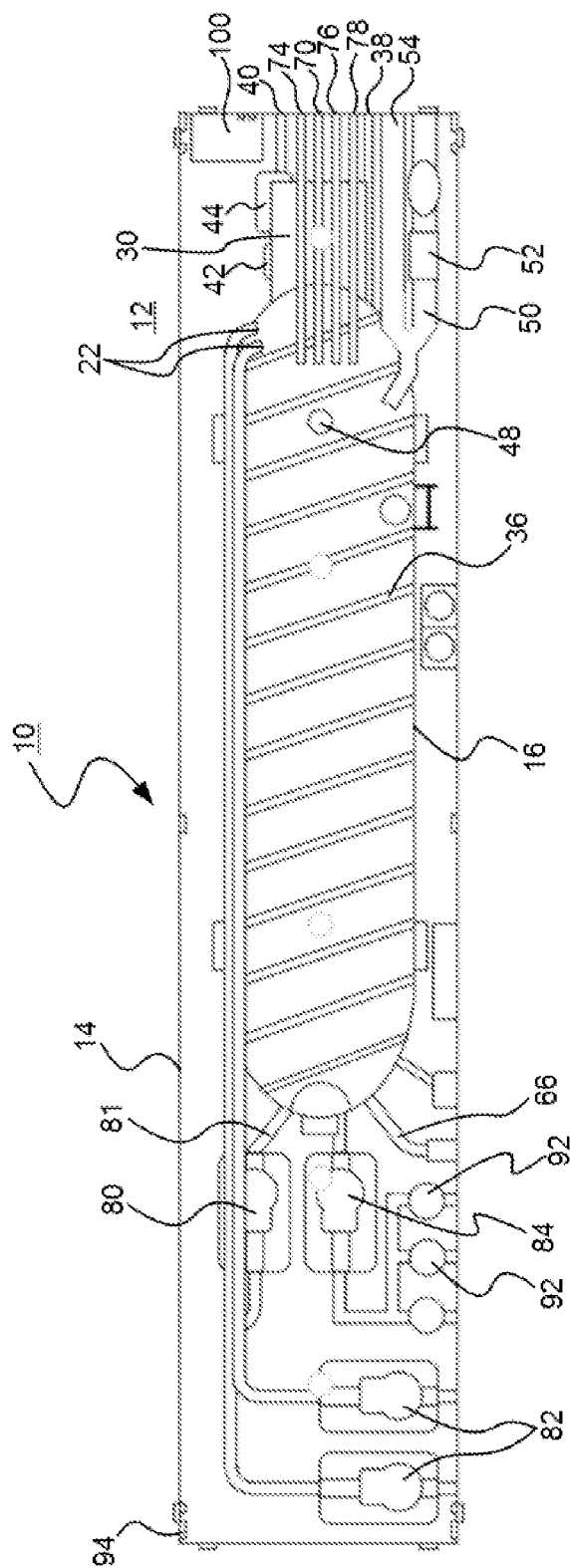
FIG. 1B is a schematic top plan view of the first interconnectable module of FIG. 1A.
Figure 1C:
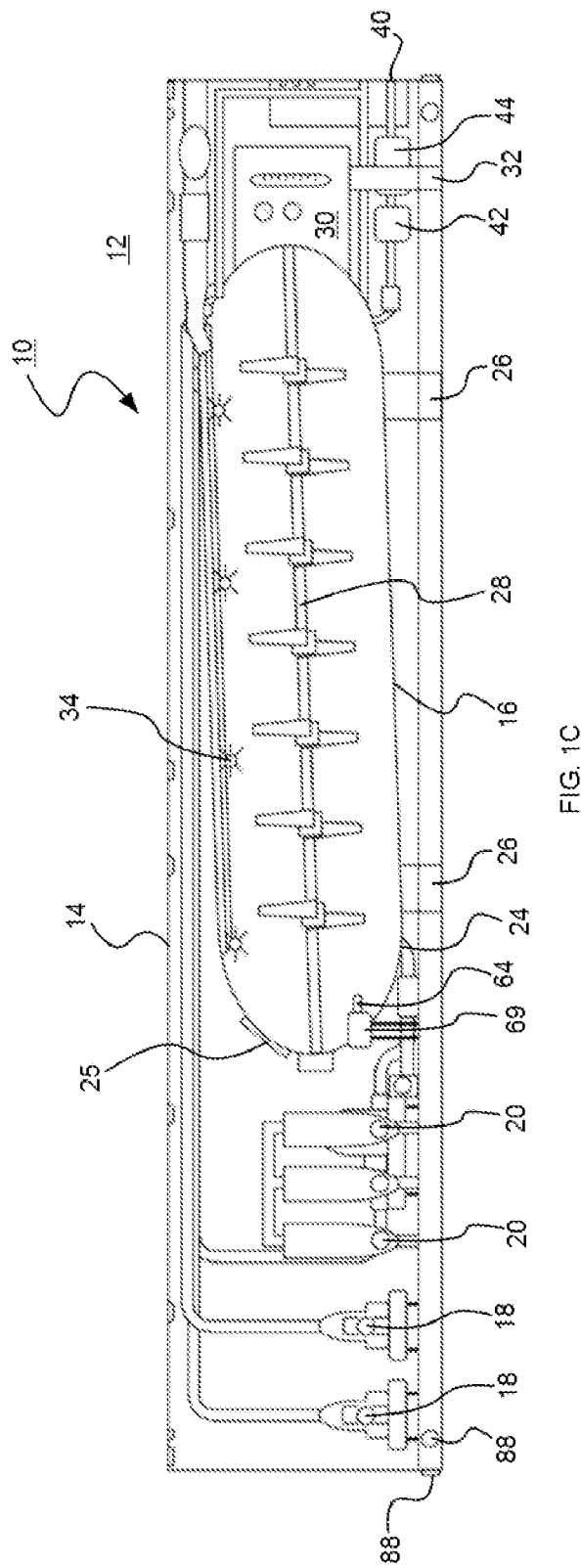
FIG. 1C is a schematic side view of the first interconnectable module of FIG. 1A showing internal reactor components.

Referring now to FIGS. 1A through 1C, a first interconnectable module 10 of a manufacturing facility 12 is shown. The interconnectable module 10 includes a housing 14 and a reactor 16 in the housing 14. The housing 12 has at least one charging inlet 18 and at least one discharging outlet 20. The reactor 16 has at least one reactor inlet 22 coupled to the at least one charging inlet 18 of the housing 14 and at least one reactor outlet 24 coupled to the at least one discharging outlet 20 of the housing 14.

In the present embodiment, the first interconnectable module 10 serves as a main reactor module. Advantageously, the use of the interconnectable module 10 provides modularity to the manufacturing facility 12 and in so doing, provides greater flexibility in managing production capacity of the manufacturing facility 12 as additional interconnectable modules may simply be added or removed depending whether a scale up or scale down of production capacity is required.

The housing 14 may be provided in the form of an intermodal container. Advantageously, this facilitates movement of the interconnectable module 10 in the event a need to increase or reduce production capacity arises. The size of the intermodal container employed may depend, for example, on production requirements and/or site restrictions. Examples of suitable intermodal containers that may be employed include standardized 10-foot, 20-foot or 40-foot long High Cube containers.

The reactor 16 may be provided in the form of a chemical vessel and may be made of stainless steel. In one embodiment, the reactor 16 may be a blending vessel capable of handling batch or semi-batch processes. The capacity of the reactor 16 may be customized to accommodate production requirements. For instance, the size of the reactor 16 may be maximized within the available space in the housing 14 if there is need for increased production capacity. In one embodiment, the reactor 16 may have a nominal volume of at least 10 cubic metres ($m^3$), but this may be increased depending on production requirements. Similarly, the design, operating temperature and operating pressure of the reactor 16 may be dependent on operational requirements. In one embodiment, the reactor 16 may be designed to withstand a temperature of about 300 degrees Celsius (° C.) to accommodate temperature surges, in particular pertinent to exothermic reactions, and a maximum pressure of about 600 kilopascal (kPa).

In the embodiment shown, the reactor 16 is provided at an incline relative to a horizontal plane of the housing 14. The incline may be between about 0 degrees (°) and about 3° from the horizontal plane of the housing 14. In one embodiment, the reactor 16 may be tilted at a slope or gradient of 1:50. Advantageously, tilting the reactor 16 facilitates fluid flow within the reactor 16 due to gravity and this in turn facilitates drainage of the reactor 16 when required. The reactor 16 may be held in place by a first support structure 26. The first support structure 26 may be a saddle support structure to maintain stability of the reactor 16 in an inclined horizontal position and to support reactor load and reactor contents as well as vibrational forces and pressure build-up arising from manufacturing operations such as agitation, circulation or transfer operations of reactants. The reactor 16 may be provided with a manway 25 to allow entry of production operators into the reactor 16 for maintenance works or cleaning purposes when required. The manway 25 may have a diameter of about 500 millimetres (20 inches).

The at least one charging inlet 18 in the housing 14 serves as a material transfer inlet into the interconnectable module 10, whilst the at least one discharging outlet 20 in the housing 14 serves as a finished or intermediate product transfer outlet from the interconnectable module 10.

In the present embodiment, piping connecting the at least one reactor inlet 22 to the at least one charging inlet 18 of the housing 14 may be arranged to direct flow of reactants entering the reactor 16 along an inner surface of the reactor 16 to reduce static build-up due to a loss of height as the reactants flow from the at least one reactor inlet 22 at a higher height to the at least one reactor outlet 24 at a lower height.

In the present embodiment, an agitator 28 is provided in the reactor 16. Advantageously, the agitator 28 facilitates effective mixing of the contents in the reactor 16 during operations to achieve a homogeneous mixture. In one embodiment, the agitator 28 may be a multiple-bladed agitator housed within the reactor 16. The agitator 28 may be coupled to an agitator motor 30 with variable frequency drive situated at an exterior of the reactor 16, the agitator motor 30 being held in place by a second support structure 32.

To facilitate cleaning of the reactor 16, at least one cleaning device 34 may be provided in the reactor 16. The at least one cleaning device 34 may be provided in the form of one or more spray-balls at an upper surface or end of the reactor 16.

In the embodiment shown, a heat tracing system 36 is coupled to the reactor 16. Advantageously, the heat tracing system 36 extending around and encapsulating the reactor 16 provides heating to the reactor 16 during manufacturing operations. In one embodiment, the heat tracing system 36 may be used to heat the reactor 16 to a maximum temperature of about 130 degrees Celsius (° C.). The heat tracing system 36 in the present embodiment includes a steam line or tracing extending around the reactor 16 and connected to the housing 14 at a steam inlet 38 and a condensate outlet 40 provided in the housing 14. A steam trap 42 and a condensate recovery system 44 may be attached at an outlet end of the steam line. In one embodiment, the steam line or steam tracing may have an internal diameter of about 19 millimetres (¾ inches). In alternative embodiments, the steam line or steam tracing may have a larger or smaller internal diameter depending on operational requirements. To address design and safety considerations, the heat tracing system 36 may be designed to accommodate low pressure steam up to a maximum pressure of about 350 kilopascals (kPa).

In the present embodiment, a pressure relief system is coupled to the reactor 16. The pressure relief system may be provided as a safety precautionary measure and may include at least one of a pressure relief valve 48 and a rupture disc line 50. The pressure relief device 48 may be provided at a top portion of the reactor 16 and the rupture disc line 50 having a rupture disc 52 may be attached to the reactor 16 as a safety measure to cope with any unexpected over-pressurization of the reactor 16 during manufacturing operations.

In the present embodiment, a scrubber system 54 is coupled to the reactor 16. The scrubber system 54 may be a water-based or an acid/alkali-based system and may include a scrubber line attached to the reactor 16 for removal of harmful particulates. An outlet end of the scrubber line may be connected to a scrubber line outlet formed in the housing 14.

The reactor 16 may also be provided with one or more of a sight glass 56, a level indicator 58, a temperature indicator 60, a pressure gauge 62, a sampling point 64 and a drainage outlet 66.

The sight glass 56 may be provided at a top section of the reactor 16 to allow manual monitoring of liquid or foaming levels in the reactor 16 by production operators as a redundancy measure if the level indicator 58 in the reactor 16 fails. The sight glass 56 also allows manual inspection of the reactor 16, the agitator 28 and the at least one cleaning device 34 to ensure that thorough cleaning has been performed. A ladder 68 may be provided to provide the production operators with safe and ergonometric access to the sight glass 56.

The sampling point 64 may be provided at a suitable height to facilitate retrieval of a small quantity of sample from the reactor 16 by production operators for quality inspection. A sampling box 69 with an enclosed height of at least 0.2 metres may be provided around an outlet of the sampling point 64 as a precautionary safety measure to contain any unexpected splashing or spillage.

The drainage outlet 66 facilitates release of materials from the reactor 16, for example, in times of over-volume, when incorrect materials are added, when off-spec products are manufactured, during clean-in-place operations or as a last resort to ease pressure in the reactor 16 during a runaway reaction. In the embodiment shown, release of materials from the reactor 16 via the drainage outlet 66 may be facilitated by the inclined position of the reactor 16.

The reactor 16 may additionally be coupled to one or more of a water line 70, an inert gas line 74, a plant air line 76 and an instrument air line 78. The water line 70 may be provided to supply water for cleaning operations and/or as a manufacturing component. The inert gas line 74 may be provided to supply inert gas for cleaning operations, reactor pressurization, purging or discharging operations and/or as a manufacturing component. The plant air line 76 may be provided to supply air to support operational requirements of the reactor 16. The instrument air line 78 may be provided to supply air to equipment supporting manufacturing operations of the reactor 16. Internal diameters of the water line 70, the inert gas line 74, the plant air line 76 and the instrument air line 78 may range from between about 19 millimetres (mm) and about 26 mm depending on operational requirements. The diameter of the pipings may be customized to meet process flow operational needs such as, for example, faster fluid flow circulation or reduced fluid velocity for a longer residence time.

In the embodiment shown, a circulating pump 80 is coupled to the reactor 16. The circulating pump 80 may be arranged to circulate reactor contents via a circulatory line 81 connecting a reactor outlet to a reactor inlet. The circulatory line 81 may be provided with an in-line mixer depending on operational requirements. Advantageously, provision of the circulating pump 80 helps promote homogeneity of reactants in the reactor 16. Examples of suitable pumps for use as the circulating pump 80 include a centrifugal pump, a gear pump and an air-operated double diaphragm (AODD) pump. The circulating pump 80 may be provided in addition or as an alternative to the agitator 28.

In the present embodiment, one or more transfer pumps 82 and 84 are coupled between the reactor 16 and at least one of the charging inlet 18 and the discharging outlet 20 of the housing 14. More particularly, one or more charging pumps 82 may be coupled between the reactor 16 and the charging inlet 18 of the housing 14. Examples of suitable pumps for use as the charging pump 82 for raw material transfer-in operations include a centrifugal pump and an AODD pump. In the same or a different embodiment, one or more discharging pumps 84 may be coupled between the reactor 16 and the discharging outlet 20 of the housing 14. Examples of suitable pumps for use as the discharging pump 84 for transfer-out operations include a centrifugal pump and an AODD pump.

The circulating pump 80 and the transfer pumps 82 and 84 may have, but are not limited to, internal diameters that are similar to piping diameters of the piping employed. Differences between the internal diameters of the circulating pump 80 and the transfer pumps 82 and 84 and piping diameter may be addressed, for example, through the use of one or more reducers (not shown). In one embodiment, the circulating pump 80 and the transfer pumps 82 and 84 may have an internal diameter of about 50 mm (2 inches).

Control valves (not shown) may be provided to control flow rate and/or pressure of transfer-in, transfer-out and/or circulatory operations involving the reactor 16 with one or more of the circulating pump 80 and the transfer pumps 82 and 84.

As will be appreciated by those of ordinary skill in the art, the present invention is not limited by the number or types of pumps employed. Fewer or more transfer pumps 82 and 84 may be employed in the interconnectable module 10 depending on operational demands. Similarly, the selection of the type of pump to use is also dependent on operational demands.

In the present embodiment, a containment system 86 is provided in the housing 14. The containment system 86 serves as a containment site for any leakage occurring in the interconnectable module 10. In one embodiment, the containment system 86 may have a height of at least about 0.2 metres (m). A volume of the containment system 86 may be increased as required. The containment system 86 may be covered with a steel grating (not shown) as a flooring designed to provide a slip resistant environment for production operators and also to allow any leakage within the interconnectable module 10 to pass through into the containment system 86.

The containment system 86 may include one or more containment drain points 88 situated at a bottom portion of an end of the interconnectable module 10. The containment drain point 88 is designed to release the contents of the containment system 86 outside of the interconnectable module 10 to, for example, a designated waste storage tank coupled to the interconnectable module 10 at the one or more containment drain points 88. A base of the containment system 86 may be provided at an incline to facilitate discharging of waste contents out of the interconnectable module 10 via the one or more containment drain points 88. When the interconnectable module 10 is connected to one or more other interconnectable modules, one or more of the containment drain points 88 may also be coupled to corresponding containment drain points of the one or more other interconnectable modules.

In the embodiment shown, a filtration unit 92 is coupled between the reactor outlet 24 and the discharging outlet 20 of the housing 14. In one embodiment, the filtration unit 92 may include a plurality of filter housings, each filter housing having a filter bag. The filter bags may come in a variety of different pore sizes, for example, 1 micron ($\mu m$), 5 $\mu m$, 10 $\mu m$, 25 $\mu m$ and 50 $\mu m$, with filter bag selection dependent on product quality specifications.

The housing 14 may be provided with one or more of a gas or smoke detector 94, a lighting system 96, an alarm system 98, a control panel unit 100 and a display screen 102.

A plurality of gas or smoke detectors 94 may be placed within the interconnectable module 10 to detect any gas leakage. The gas and smoke detectors 94 may be used to detect combustible, flammable and/or toxic gases within the interconnectable module 10 and may work with the alarm system 98 to provide a warning or evacuation alert upon detection of any leakage and/or impending danger.

The lighting system 96 may be provided in the interconnectable module 10 to provide adequate light in more condensed areas of the interconnectable module 10. Advantageously, this facilitates maintenance works in the interconnectable module 10, especially in more deeply located areas of the interconnectable module 10. Provision of the lighting system 96 also allows manufacturing operations or maintenance works to be carried out effectively and safely at night.

Access to the control panel unit 100 may be provided on an external surface of the interconnectable module 10 to allow manual adjustments to the reactor 16 by production operators without having to enter the interconnectable module 10.

The display screen 102 may show production status of the manufacturing operations, the stage of the manufacturing process as reference with the manufacturing procedure and real-time status of the manufacturing operations. Real-time data displayed by the display screen 102 may include, for example, a level indicator of the reactor 16, reactor temperature and pressure, transfer-in temperature, transfer-out temperature, pressure and transfer flow rate, and opening and closing of the circulating pump 80 and the transfer pumps 82 and 84, valves, circulation lines, the drainage outlet 66 and the sampling point 64.

In the present embodiment, the interconnectable module 10 is also equipped with a plurality of foam fire extinguishers 104 in case of a fire.

Equipment, piping and vessel within the interconnectable module 10 may be monitored by a distributed control system (DCS) such that information from field devices such as the level indicator 58, the temperature indicator 60 and the pressure gauge 62 is transmitted back to a central control room within the manufacturing plant for supervision by production operators. In the event a potential safety hazard arises, a warning alert may be triggered via the DCS to alert production operators in the central control room in addition to the warning or evacuation alert provided by the alarm system 98.

Figure 2A:
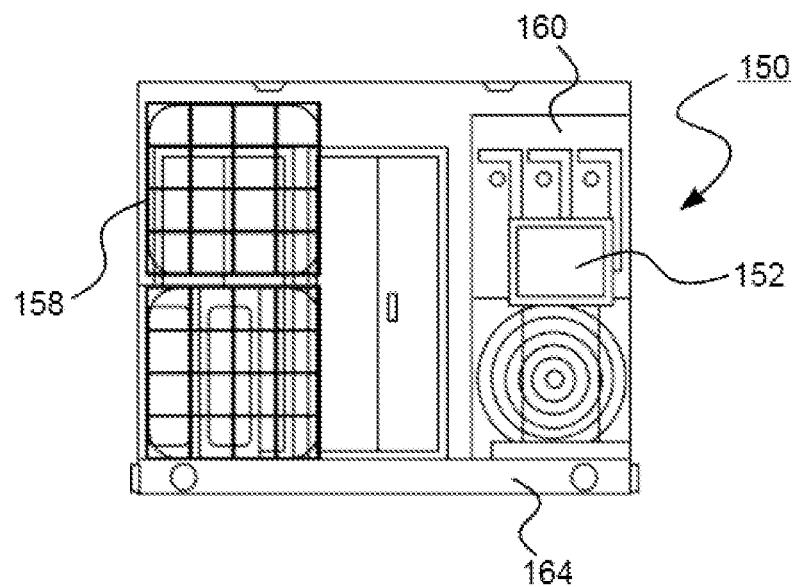
FIG. 2A is a schematic side view of a second interconnectable module of the manufacturing facility in accordance with an embodiment of the present invention.
Figure 2B:
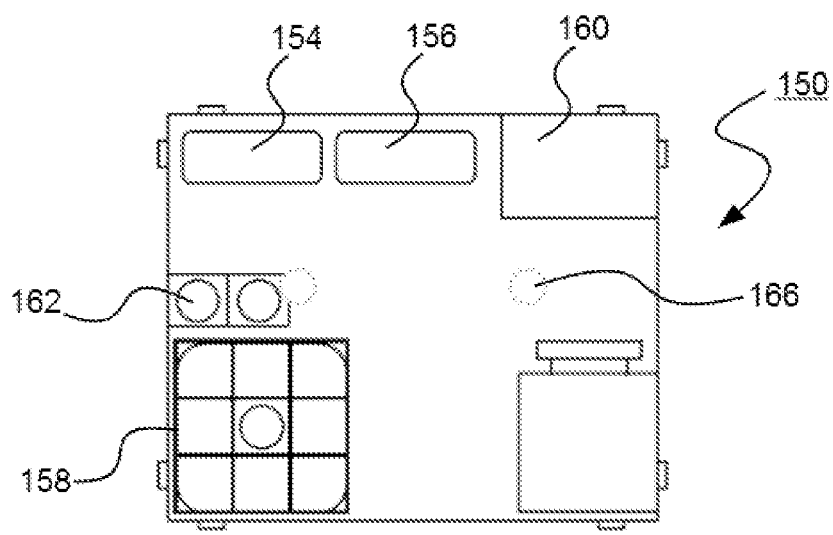
FIG. 2B is a schematic top plan view of the second interconnectable module of FIG. 2A.

Referring now to FIGS. 2A and 2B, a second interconnectable module 150 is shown. In the present embodiment, the second interconnectable module 150 is provided with one or more of a weighing scale 152, a production cabinet 154, a maintenance cabinet 156, a spare intermediate bulk container (IBC) 158, a racking system 160, a fire extinguisher 162, a containment system 164 and a lighting system 166.

In the present embodiment, the second interconnectable module 150 serves as an auxiliary production and maintenance module, providing a side enhancement to make manufacturing operations more convenient. The second interconnectable module 150 may be housed in an intermodal container. Advantageously, this facilitates movement of the second interconnectable module 150 should such a need arise. The size of the intermodal container employed may depend, for example, on usage requirements and/or site restrictions. Examples of suitable intermodal containers that may be employed include standardized 10-foot, 20-foot or 40-foot long High Cube containers.

Although shown as being housed in separate interconnectable modules in FIGS. 1A, 1B, 1C, 2A and 2B, the one or more of the weighing scale 152, the production cabinet 154, the maintenance cabinet 156, the spare intermediate bulk container (IBC) 158, the racking system 160 and the fire extinguisher 162 may be provided in the same interconnectable module 10 as the reactor 16 in an alternative embodiment.

To achieve a predetermined batch volume for a targeted product batch size, multiple drums may be utilized for raw material charging during a batch operation. To achieve an accurate batch volume, a mass of a final drum is usually measured to ensure that a precise raw material quantity is charged into the reactor 16. Accordingly, the weighing scale 152 may be provided in the second interconnectable module or auxiliary unit 150 to facilitate measurement of raw material drums. The weighing scale 152 may include a weighing scale reader 164.

The production cabinet 154 provides storage space for necessary equipment and accessories for production operators to access conveniently during manufacturing operations. Examples of items that may be stored in the production cabinet 154 include personal protective equipment, respiratory masks, gloves, torchlights, chemical safety goggles, spill kits and sample bottles.

The maintenance cabinet 156 provides storage space for necessary equipment and accessories for production operators to access conveniently during maintenance works. Examples of items that may be stored in the maintenance cabinet 156 include equipment and tools such as, for example, O-rings, gaskets, spare valves, rupture discs, filter bags and diaphragm seals.

The additional space afforded by the second interconnectable module 150 may be used as a storage area for one or more spare intermediate bulk container (IBCs) 158 for convenient access. The spare IBCs may be used to contain drainage from the reactor 16 and/or the containment system 86. The spare IBCs may also be useful as a contingency measure providing additional containment space for the manufacturing facility 12.

During raw material transfer operations when raw material is charged into the reactor 16 via the transfer-in pumps 82 from drums, IBCs or ISO tank containers, hoses and lances may be required to facilitate these transfers. Provision of the racking system 160 in the second interconnectable module 150 allows convenient storage and access to the hoses and the lances when required.

Fire extinguishers 162 provided in the second interconnectable module 150 serve as a first line of emergency response if a small fire were to break out and are provided in addition to the foam fire extinguishers 104 in the first interconnectable module 10. The fire extinguishers 162 may be foam fire extinguishers, carbon dioxide fire extinguishers or dry fire extinguishers depending on operational requirements.

The containment system 164 serves a similar function to that of the first interconnectable module 10 and when coupled to the containment system 86 of the first interconnectable module 10, increases the containment capacity of the manufacturing facility 12.

The lighting system 166 provides lighting in the second interconnectable module 150 when access into the second interconnectable module 150 is required by production operators.

Referring now to FIG. 3, a manufacturing facility 200 is shown. The manufacturing facility 200 in the embodiment shown includes the first interconnectable module 10 to which is coupled the second interconnectable module 150. In the present embodiment, the first and second interconnectable modules 10 and 150 are provided with castings 202 at corners of the first and second interconnectable modules 10 and 150. The castings 202 are used to connect and secure the first and second interconnectable modules 10 and 150 to one another. Advantageously, the castings 202 provide the option of securing multiple interconnectable modules together if needed, facilitate connection of containment drain points between modules and allow interconnectable modules to be secured together when being shipped or transported.

Figure 5:
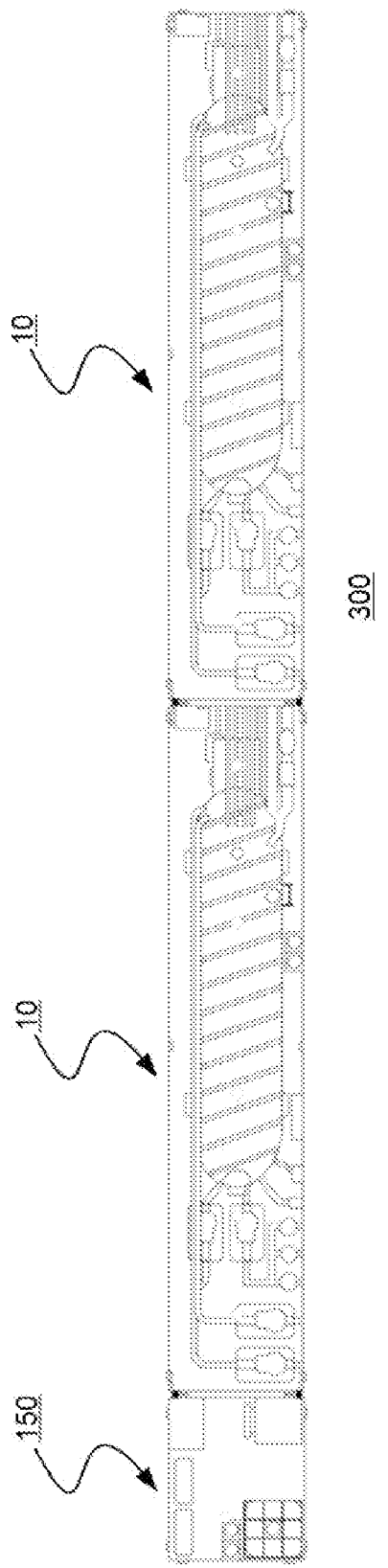

Referring now to FIGS. 4 through 6, various configurations of manufacturing facilities with different numbers and layouts of interconnectable modules are shown. In particular, FIG. 4 shows a manufacturing facility 250 having two (2) first interconnectable modules 10 connected to one another in a side-by-side arrangement and a standalone second interconnectable module 150, FIG. 5 shows a manufacturing facility 300 having two (2) first interconnectable modules 10 and a second interconnectable module 150 in a series arrangement, and FIG. 6 shows a manufacturing facility 350 having three (3) first interconnectable modules 10—two of which are connected to one another in a side-by-side arrangement—and a standalone second interconnectable module 150.

As will be appreciated by those of ordinary skill in the art, the present invention is not limited by the number of interconnectable modules employed or the layout configuration of the interconnectable modules.

As is evident from the foregoing discussion, the present invention provides a modular manufacturing facility. Advantageously, this allows swift scaling up or down of production capacity of the manufacturing facility and thereby providing greater flexibility in managing the production capacity of the manufacturing facility. Additionally, this flexibility in managing production capacity is further enhanced by easy assembly and detachment of the interconnectable modules, facilitating transportation and rapid set up of manufacturing facilities in areas with greater business demand. Furthermore, as all the manufacturing components are integrated within individual interconnectable modules, the overall production process can be streamlined with production operators being able to access the manufacturing facility in a singular location for raw material unloading, transfer-in operations, finished product transfer-out, filtration, sampling, valve opening and closing and clean-in-place operations. Further advantageously, integration of all piping and equipment into individual interconnectable modules also facilitates easier accessibility and faster maintenance, thereby reducing downtime and increasing production time available for manufacturing operations. Within the interconnectable module, piping and equipment may be easily retrofitted to modify technical specifications of and layout within the interconnectable module.

While preferred embodiments of the invention have been illustrated and described, it will be clear that the invention is not limited to the described embodiments only. Numerous modifications, changes, variations, substitutions and equivalents will be apparent to those skilled in the art without departing from the scope of the invention as described in the claims.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A manufacturing facility, comprising:
one or more interconnectable modules, wherein at least one of the one or more interconnectable modules comprises:
a housing having at least one charging inlet and at least one discharging outlet, wherein the housing is an intermodal container; and
a reactor in the housing, the reactor having at least one reactor inlet coupled to the at least one charging inlet of the housing and at least one reactor outlet coupled to the at least one discharging outlet of the housing, wherein the at least one reactor inlet is at a higher height than the at least one reactor outlet; and
piping connecting the at least one reactor inlet to the at least one charging inlet of the housing, wherein the piping is arranged to direct flow of reactants entering the reactor along an inner surface of the reactor.

2. The manufacturing facility of claim 1, wherein the reactor is provided at an incline relative to a horizontal plane of the housing.

3. The manufacturing facility of claim 2, wherein the incline is between about 0 degrees (°) and about 3° from the horizontal plane of the housing.

4. The manufacturing facility of claim 1, further comprising an agitator provided in the reactor.

5. The manufacturing facility of claim 1, further comprising at least one cleaning device provided in the reactor.

6. The manufacturing facility of claim 1, further comprising a heat tracing system coupled to the reactor.

7. The manufacturing facility of claim 1, further comprising a pressure relief system coupled to the reactor.

8. The manufacturing facility of claim 1, further comprising a scrubber system coupled to the reactor.

9. The manufacturing facility of claim 1, wherein the reactor is provided with one or more of a sight glass, a level indicator, a temperature indicator, a pressure gauge, a sampling point and a drainage outlet.

10. The manufacturing facility of claim 1, further comprising a circulating pump coupled to the reactor.

11. The manufacturing facility of claim 1, further comprising one or more transfer pumps coupled between the reactor and at least one of the at least one charging inlet and the at least one discharging outlet of the housing.

12. The manufacturing facility of claim 1, further comprising a containment system provided in the housing.

13. The manufacturing facility of claim 1, wherein the reactor is coupled to one or more of a water line, an inert gas line, a plant air line, and an instrument air line.

14. The manufacturing facility of claim 1, further comprising a filtration unit coupled between the at least one reactor outlet and the at least one discharging outlet of the housing.

15. The manufacturing facility of claim 1, wherein the housing is provided with one or more of a gas or smoke detector, a lighting system, an alarm system, a control panel unit, and a display screen.

16. The manufacturing facility of claim 1, further comprising one or more of a weighing scale, a production cabinet, a maintenance cabinet, a spare intermediate bulk container (IBC), a racking system and a fire extinguisher provided in a same or a different interconnectable module than the reactor.

* * * * *